US012662557B2

(12) United States Patent  
Xia et al.

(10) Patent No.: US 12,662,557 B2  
(45) Date of Patent: Jun. 23, 2026

(54) PREPARATION PROCESS FOR SOLID ACRYLIC RESIN SUITABLE FOR UV PHOTOCURING SYSTEM

(71) Applicant: PIONEER CHEMICALS (YANGZHOU) CO., LTD, Yangzhou (CN)

(72) Inventors: Wei Xia, Shanghai (CN); Jisheng Shen, Shanghai (CN); Zhengfeng Zhang, Shanghai (CN)

(73) Assignee: PIONEER CHEMICALS (YANGZHOU) CO., LTD, Yangzhou (CN)

( * ) Notice: Subject to any disclaimer, the term of this patent is extended or adjusted under 35 U.S.C. 154(b) by 852 days.

(21) Appl. No.: 17/780,077

(22) PCT Filed: Jan. 13, 2020

(86) PCT No.: PCT/CN2020/071649  
§ 371 (c)(1),  
(2) Date: May 26, 2022

(87) PCT Pub. No.: WO2021/103296  
PCT Pub. Date: Jun. 3, 2021

(65) Prior Publication Data  
US 2023/0002521 A1 Jan. 5, 2023

(30) Foreign Application Priority Data

Nov. 29, 2019 (CN) .......................... 201911196742.5

(51) Int. Cl.  
*C08F 20/06* (2006.01)  
*C08F 2/48* (2006.01)  
*C08K 5/14* (2006.01)

(52) U.S. Cl.  
CPC ................ *C08F 20/06* (2013.01); *C08F 2/48* (2013.01); *C08K 5/14* (2013.01)

(58) Field of Classification Search  
CPC .... C08F 20/06; C08F 2/48; C08F 2/02; C08F 2/38; C08F 220/14; C08F 265/06; (Continued)

(56) References Cited

U.S. PATENT DOCUMENTS 5,073,615 A * 12/1991 Shen ...................... C08F 220/12  
526/262  
5,328,962 A * 7/1994 Shen ........................ C08L 33/12  
525/308  
(Continued)

FOREIGN PATENT DOCUMENTS

CN 1130399 C 12/2003  
CN 102351965 A 2/2012  
(Continued)

OTHER PUBLICATIONS

Rybolt et al (Economical High-Temperature Water Bath Control and Monitoring with a Sous Vide Cooking Device) J. Chem. Educ. 2018, 95, 1402â1405 (Year: 2018).*  
International Search Report of Application No. PCT/CN2020/071649 mailed Jul. 29, 2020, 8 pages.  
W.H. Li et al. "Kinetics of the free-radical copolymerization of methyl methacrylate/ethylene glycol dimethacrylate: 1. Experimental investigation", Polymer, vol. 30, Aug. 31, 1989, 5 pages.  
S. Zhu et al. "Heat effects for free-radical polymerization in glass ampoule reactors", Polymer, vol. 16, Dec. 31, 1991, 5 pages.

*Primary Examiner* — Doris L Lee  
(74) *Attorney, Agent, or Firm* — William J. Barber; WARE FRESSOLA MAGUIRE & BARBER LLP

(57) ABSTRACT

A preparation process for a solid acrylic resin suitable for a UV curing system is a bulk polymerization method and comprises the steps: adding 100 parts by mass of at least one monofunctional monomer(s) having one polymerizable double bond per molecule, 1-10 parts by mass of one difunctional monomer having two polymerizable double bonds per molecule, 0.1-5.0 parts by mass of an initiator and 1-10 parts by mass of a chain transfer agent to a bulk (Continued)

polymerization reactor capable of water bath heating; homogenizing them by stirring; and then heating the bulk polymerization reactor with a constant temperature water bath at 40-90° C. until the polymerization reaction is completed.

6 Claims, 1 Drawing Sheet

(58) Field of Classification Search
CPC .......... C08K 5/14; C09D 133/14; C09D 4/06; C09D 151/003; C09D 5/08; C09D 133/12
See application file for complete search history.

(56) References Cited

U.S. PATENT DOCUMENTS

| | | | | |
|---|---|---|---|---|
| 6,218,467 B1 * | 4/2001 | Wicker | .................... | C08L 33/12 |
| | | | | 525/166 |
| 6,713,584 B1 * | 3/2004 | Chisholm | ............. | C08F 220/12 |
| | | | | 526/318.4 |

FOREIGN PATENT DOCUMENTS

| | | | |
|---|---|---|---|
| JP | H05345809 | A | 12/1993 |
| WO | 02053608 | A1 | 7/2002 |

* cited by examiner

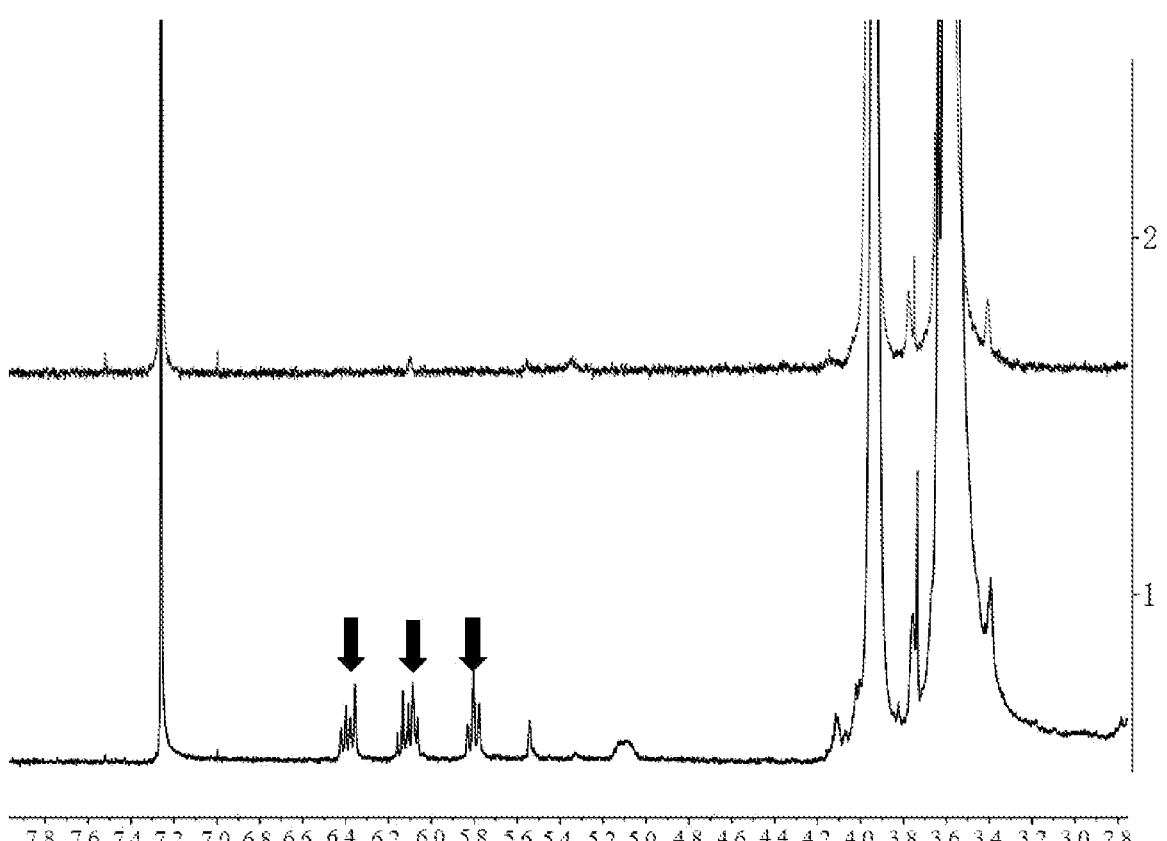

PREPARATION PROCESS FOR SOLID ACRYLIC RESIN SUITABLE FOR UV PHOTOCURING SYSTEM

CROSS-REFERENCE TO RELATED APPLICATIONS

The present application claims priority to International Patent Application No. PCT/CN2020/071649, filed on Jan. 13, 2020, which claims priority to Chinese Patent Application No. 201911196742.5, filed on Nov. 29, 2020. The aforementioned patent applications are hereby incorporated by reference in their entirety.

FIELD OF THE INVENTION

The present invention relates to a preparation process of a solid acrylic resin and more particularly to a preparation process of a solid acrylic resin suitable for use in a UV curing system, it belongs to the technical field of preparation of functional materials.

BACKGROUND OF THE INVENTION

In recent years, with the rise of environmental awareness and in response to various environmental protection policies introduced in China, the industrial sector has experienced tremendous changes. As one of the most affected, the chemical industry is faced with new challenges in this new era. Since the UV curing technology is an environment-friendly and low-VOC emission technology, and the use of UV curing in film formation provides a wide variety of advantages including high efficiency, energy savings, environmental friendliness, economy and excellent adaptability, the UV curing technique has become the main development and one of the research hotspots.

And because an acrylic resin has the advantages of good gloss and color retention, weather resistance, fast drying, convenient construction, easy coating, recoating and rework, etc., the acrylic resin is usually added to a UV curing system in the prior art, in order to adjust the composition's viscosity, reduce its shrinkage, lower its cost, increase its initial adhesion, accelerate its surface drying, enhance its interlayer adhesion, or for other purposes. However, the acrylic resins currently used in UV curing systems are mainly saturated resins, which cannot undergo further cross-linking reaction during the process of photo-curing film formation. They are only used as inert additives/auxiliaries in UV curing systems. This combination of physical coating affects the physical and chemical properties of the coating film, such as coating hardness, adhesion to the substrate, alcohol resistance and corrosion resistance, and thus the application scope of the acrylic resin is limited.

In addition, with the increasing environmental protection requirements, more and more coating material manufacturers desire to increase solid contents of their solvent-based coating material products. However, using the existing acrylic resin to increase the solid content will encounter the following two problems: it is difficult to continue to dissolve under high solid content; and under high solid content, the viscosity of the coating is too large, so that the product cannot be normally coated. Therefore, the acrylic resin with high solid content and low viscosity properties has also become an ideal product for craving in the field of UV curing application.

Also, the current solid acrylic resins for coatings and inks are mainly produced by suspension polymerization. Due to the self-acceleration effect of bulk polymerization in the middle and late stages of polymerization, it is easy to cause problems such as explosive polymerization and difficult control of polymerization temperature, so that the obtained solid acrylic resin can easily lead to too wide molecular weight distribution, large molecular weight distribution coefficient, and too many residual monomers. If such solid acrylic resin is used to prepare coatings or inks, it is easy to cause defects in the produced coatings or inks, such as poor storage stability, easy precipitation, delamination and floating during storage, a considerable odor, weak adhesion to a substrate and frequent bubbling, peeling, discoloration, shrinkage and other defects. However, as well known in the art, a suspension polymerization process has the problem of wastewater treatment, so it can't meet the current environmental protection requirements; additionally, the suspension polymerization requires the addition of a polymerization inhibitor at the late stage to terminate the reaction, which necessitates strict requirements on process control and leads to unsatisfactory product quality consistency and a high defect rate. In contrast, the bulk polymerization method only needs to add monomers, initiators and molecular weight regulators, it doesn't require solvents so that no waste water is generated. Since bulk polymerization has many advantages such as environmental friendliness, high production efficiency, low production cost, pure product, uniform product color and good product quality consistency, bulk polymerization has now become a polymerization process encouraged by today's industrialization.

Therefore, how to realize the industrial production of solid acrylic resins with narrow molecular weight distribution, low residual monomers and excellent comprehensive properties by bulk polymerization has also become one of the current hot research issues in this field.

SUMMARY OF THE INVENTION

In view of the problems and demands in the prior art discussed above, it is an object of the present invention to provide a preparation process of a solid acrylic resin suitable for use in a UV curing system.

To achieve the above object, the subject matter of the present invention is as follows:

A preparation process of a solid acrylic resin suitable for use in a UV curing system, which is a bulk polymerization method and comprises the steps:

adding 100 parts by mass of at least one monofunctional monomer(s) having one polymerizable double bond per molecule, 1-10 parts by mass of one difunctional monomer having two polymerizable double bonds per molecule, 0.1-5.0 parts by mass of an initiator and 1-10 parts by mass of a chain transfer agent to a bulk polymerization reactor capable of water bath heating;

homogenizing them by stirring;

and then heating the bulk polymerization reactor with a constant temperature water bath at 40-90° C. until the polymerization reaction is completed.

As a preferable scheme, the preparation process comprises the following specific steps:

adding 100 parts by mass of two monofunctional monomers each having one polymerizable double bond per molecule, 1-5 parts by mass of one difunctional monomer having two polymerizable double bonds per molecule, 0.3-2.0 parts by mass of an initiator and 3-6 parts by mass of a chain transfer agent to a bulk polymer-ization reactor capable of water bath heating;

homogenizing them by stirring;

and then heating the bulk polymerization reactor with a constant temperature water bath at 50-60° C. until the polymerization reaction is completed.

As a preferable scheme, the monofunctional monomer(s) is(are) selected from at least one of methyl methacrylate, ethyl methacrylate, propyl methacrylate, n-butyl methacry-late, isobutyl methacrylate, tert-butyl methacrylate, iso-octyl methacrylate, isobornyl methacrylate, lauryl methacrylate, methacrylic acid, acrylic acid, ethyl acrylate, methyl acry-late, butyl acrylate, iso-octyl acrylate, lauryl acrylate and styrene.

Preferably, the monofunctional monomer is a combina-tion of methyl methacrylate and n-butyl methacrylate.

More preferably, in 100 parts by mass of monofunctional monomers, the combined mass ratio of methyl methacrylate to n-butyl methacrylate is 2:1 to 3:1.

As a preferable scheme, the difunctional monomer is selected from one of ethylene glycol diacrylate, hexanediol diacrylate, tripropylene glycol diacrylate, butanediol diacry-late, neopentyl glycol diacrylate, diethylene glycol diacry-late, triethylene glycol diacrylate, dipropylene glycol dia-crylate and allyl acrylate.

As a preferable scheme, the initiator is composed of a main initiator and a co-initiator, wherein the mass proportion of the co-initiator is 0-20%.

Preferably, the main initiator is selected from at least one of azobisisobutyronitrile, 1-tert-amylazo-1-cyanocyclo-hexane, lauroyl peroxide, 1-tert-butylazo-1-cyanocyclo-hexane, tert-butyl peroxyoctanoate, tert-butyl peroxy-2-eth-ylhexanoate, tert-butyl peroxybenzoate, butyl peroxybenzoate, tert-butyl peroxyformate, di-tert-butyl per-oxide, diisopropylbenzene hydroperoxide, tert-amyl hydroperoxide and tert-butyl hydroperoxide; and the co-initiator is selected from at least one of 2,2-di(tert-butylp-eroxy)butane, 2,5-dimethyl-2,5-di(tert-butylperoxy)hexane (i.e., bis-pentasulfide) and di-tert-butylperoxyhexahydro-terephthalate (e.g.: KAYAESTER HTP-65W).

Preferably, the initiator is composed of a main initiator and a co-initiator, wherein the main initiator is lauroyl peroxide, and the co-initiator is 2, 5-dimethyl-2, 5-di(tert-butylperoxy)hexane or di-tert-butylperoxyhexahydrotereph-thalate, and the mass ratio of the main initiator to the co-initiator is 5:1.

As a preferable scheme, the chain transfer agent is selected from at least one of n-propyl mercaptan, n-butyl mercaptan, n-octyl mercaptan, n-dodecyl mercaptan, dith-ioester and α-methylstyrene dimmer.

Compared with the prior art, the present invention has the following significant beneficial effects:

1) As demonstrated by tests and analysis, the solid acrylic resin obtained by the preparation process of the present invention has a low residual monomer percentage (can be lower than 1%) and a narrow molecular weight distribution (the PD value can be less than 3.0);

2) As demonstrated by tests and analysis, the solid acrylic resin obtained by the preparation process of the present invention has active double bonds, therefore, when it is used in the UV curing system, it can participate in the UV curing film-forming reaction, and form an integral three-dimensional cross-linked network structure together with monomers in the UV curing system, which is beneficial to accelerate the UV curing rate and reduce the shrinkage of the coating;

3) As demonstrated by experiments, the solid acrylic resin obtained by the preparation process of the present invention has solubility in organic solvents, it can be dissolved in organic solvents such as dimethylbenzene, dichloromethane and ethyl acetate with a solid content of 30% at room temperature, especially, its solubility in ethyl acetate can reach 60% solid content, which is very beneficial to be used in the UV curing system desiring a high solid content;

4) As demonstrated by tests for application, the solid acrylic resin obtained by the preparation process of the present invention exhibits low viscosity properties at high solid contents. When dissolved in ethyl acetate, it has a viscosity as low as 17 mpa·s at a solid content of 30%, in particular, a viscosity as low as 280 mpa·s even at a solid content of 50%. This will be very beneficial to achieve high solid content formulations to reduce the use of organic solvents, which will be more beneficial to meet environmental requirements;

5) As demonstrated by experiments, the solid acrylic resin obtained by the preparation process of the present invention has good compatibility with many UV cur-able monomers, and at 70° C., it can be completely compatible with many UV curable monomers at a solid content of at least 15% to form transparent solutions, which is very suitable for use in a UV curing system;

6) Through the coating experiment on PVC plate, it can be known that the coating made from the solid acrylic resin obtained by the preparation process of the present invention shows better adhesion to the substrate, high hardness as H pencil, strong resistance to wiping with ethanol and butanone, good acid and alkali resistance and good scrub resistance, and the coating has no whitening, bubbling, peeling, discoloration and other defects;

7) As demonstrated by tests for application on a photo-curable coating made from the solid acrylic resin obtained by the preparation process of the present invention, the photocurable coating exhibits better hardness (as high as that of 2H pencils) and better solvent resistance (500 cycles of forth-and-back wiping with ethanol and 195 cycles of forth-and-back wiping with butanone, both at a load of 0.5 kg), it is therefore very suitable for preparing UV curable coating or paint;

8) In addition, the process of the present invention also has many other advantages including ease of operation, short reaction cycle, environmental friendliness, energy savings, and easy to realize batch and continuous production;

In conclusion, compared with the prior art, the present invention not only has significant progress, but also pro-duces outstanding beneficial effects.

BRIEF DESCRIPTION OF THE DRAWINGS

FIG. 1 shows a proton nuclear magnetic resonance (1H NMR) spectrum of a saturated solid acrylic resin (simply a MMA-co-BMA polymer, the preparation of which did not involve the use of the difunctional monomer TPGDA used in the present invention) in comparison with a 1H NMR spectrum of a solid acrylic resin prepared in accordance with the present invention.

DETAILED DESCRIPTION OF THE INVENTION

The present invention is more completely described in greater detail below by way of examples.

In the following examples and comparative examples, a molecular weight distribution of each resulting solid acrylic resins was determined as follows:

A sample of the resin was dissolved in tetrahydrofuran and its molecular weight distribution was determined using gel permeation chromatography employing PS with different molecular weights as calibration standards, tetrahydrofuran at a flow rate of 1 mL/min as a mobile phase, and an RI detector.

In the following examples and comparative examples, a residual monomer percentage of each resulting polymer was determined as follows:

An accurately weighed 15 g sample of the resin was dissolved in 100-150 ml of dichloromethane, followed by addition of EMA as an internal standard in an amount of 1% (w/w) (of the polymer sample). The sample was then injected into a GC instrument configured with an inlet temperature of 200° C., a column temperature rising from 100° C. to 230° C. within 15 minutes and maintained at 230° C. for 15 minutes, a detector temperature of 200° C. A cotton filter is placed at the GC inlet to remove undissolved substances. The residual monomer percentage is calculated as the percentage of the area of a peak corresponding to monomer residuals in the area of a peak corresponding to the internal standard.

Example 1-3

432 g of methyl methacrylate (MMA), 150 g of n-butyl methacrylate (BMA), 18 g of tripropylene glycol diacrylate (TPGDA), 3 g of lauroyl peroxide and 30 g of 1-dodecanethiol were added into a bulk polymerization reaction bag, after mixing them evenly, the bulk polymerization reaction bag was placed in a water bath, and then the polymerization reaction was carried out under the constant temperature heating of the water bath until the polymerization reaction was completed (the specific water bath temperature and reaction time are shown in Table 1), and then the bulk polymerization bag was removed from the water bath and cooled to room temperature, the resulting solid acrylic resin was pulverized as a final product.

TABLE 1

| | Reaction Conditions and Test Results of the Examples | | | |
|---|---|---|---|---|
| No. | Water bath temperature (° C.) | Polymerization reaction time (h) | Residual monomer percentage (%) | Molecular weight distribution (PD = Mw/Mn) |
| Example 1 | 50 | 16 | 3.72 | 2.77 |
| Example 2 | 55 | 10 | 2.81 | 2.54 |
| Example 3 | 60 | 8 | 4.11 | 3.65 |

As can be seen from the data in Table 1, solid acrylic resins with narrow molecular weight distributions and low residual monomer percentages can be prepared using methods according to the present invention. Notably, best results including both a low residual monomer percentage (2.81%) and a narrow molecular weight distribution (a PD value of only 2.54) were obtained from the polymerization reaction proceeding in the water bath at the constant temperature of 55° C.

Comparative Example 1

This comparative example differs from the above-mentioned Example 2 only in that heating was accomplished at a constant temperature electrically instead of by a water bath. Specifically, the bulk polymerization reaction bag was placed in an oven at a constant temperature of 55° C. until the polymerization reaction was complete. After the polymerization reaction was end, molecular weight distribution and the residual monomer percentage tests were performed, and the results are summarized in Table 2.

Comparative Example 2

The only difference between this comparative example and the above-mentioned Example 2 is that the constant temperature heating of the water bath is replaced by the electric heating with gradient temperature rise. Specifically, after the bulk polymerization reaction bag was placed in an electrical oven, it was heated therein and thus caused the polymerization reaction to proceed successively at 55° C. for 16 h, at 75° C. for 8 h, at 95° C. for 8 h and at 120° C. until the polymerization reaction was complete. After the polymerization reaction was end, molecular weight distribution and residual monomer percentage tests were performed, and the results are summarized in Table 2.

TABLE 2

| | Reaction Conditions and Test Results of the Comparative Examples | | | |
|---|---|---|---|---|
| No. | Heating (° C.) | Polymerization reaction time (h) | Residual monomer percentage (%) | Molecular weight distribution (PD = Mw/Mn) |
| Comparative Example 1 | Electric heating constantly at 55 | 50 | 16.13 | 7.58 |
| Comparative Example 2 | Electric heating successively at 55/75/95/120 steps | 16/8/8/8 (total 40) | 15.47 | 7.24 |

As seen from a comparison between the data of Table 1 and those of Table 2, heating in the water bath at the constant temperature yielded surprising results over the traditional electric heating approach under the same condition, including a considerably shortened reaction time (from 50 h to 10 h), a significantly reduced residual monomer percentage (from 16.13% to 2.81%), a remarkably improved molecular weight distribution (from a PD value of 7.58 to 2.54). Although the conventional heating approach for bulk polymerization (successively at a series of temperature steps) achieved some improvements over the traditional constant temperature approach, such improvements were insignificant and achieved at the expense of increases in operational complexity and risk.

Examples 4-5

432 g of MMA, 150 g of BMA, 18 g of TPGDA, 3 g of lauroyl peroxide, 0.6 g of 2,5-dimethyl-2,5-di(tert-butylperoxy)hexane (perhexa25b) or di-tert-butylperoxyhexahydroterephthalate (Kayaester HTP-65W) and 30 g of 1-dodecanethiol were added into a bulk polymerization reaction bag, after mixing them evenly, the bulk polymerization reaction bag was placed and heated in a water bath at a constant temperature of 55° C., and then the polymerization reaction was carried out until the polymerization reaction was completed, and then the bulk polymerization bag was removed from the water bath and cooled to room temperature, the resulting solid acrylic resin was pulverized as a final product.

The molecular weight distribution and residual monomer percentage tests were performed, and the results are summarized in Table 3.

TABLE 3

Reaction Conditions and Test Results of the Examples

| No. | co-initiator | Polymerization reaction time (h) | Residual monomer percentage (%) | Molecular weight distribution (PD = Mw/Mn) |
|-----|--------------|----------------------------------|---------------------------------|---------------------------------------------|
| Example 2 | none | 10 | 2.81 | 2.54 |
| Example 4 | perhexa25b | 8 | 0.88 | 2.65 |
| Example 5 | Kayaester HTP-65W | 8 | 0.97 | 2.77 |

As can be seen from the data in Table 3, under the same condition, the addition of the co-initiator (perhexa25b or Kayaester HTP-65W) at a certain proportion can result in a significant decrease in the residual monomer percentage (from 2.81% to less than 1%).

Proton Nuclear Magnetic Resonance ($^1$H NMR) Analysis

First, two resins [one of which is a saturated solid acrylic resin, which is obtained by copolymerization of MMA and BMA only, does not contain the bifunctional monomer TPGDA described in the present invention, and the other resin is the solid acrylic resin obtained in accordance with Example 2, 4 or 5 of the present invention] 20 g of each were dissolved in 5 mL of dichloromethane at room temperature. Then, each of the resulting two solutions was added dropwise to 250 mL of n-hexane under stirring so that the resin precipitated from the dichloromethane/n-hexane mixed solvent. The precipitate was filtered, washed with a solvent to remove monomer residuals, baked and dried in an oven at 40° C. and subjected to $^1$H NMR analysis. The resulting spectra of the two resins are shown in FIG. 1.

As shown in FIG. 1, the saturated solid acrylic resin does not show any noticeable peak at 5-7 ppm, while the inventive solid acrylic resin shows three remarkable multiplet peaks at 5-7 ppm, which are attributed to three hydrogens on an unsaturated double bond and have a ratio of integrals of 1:1:1. It is well known that, in $^1$H NMR spectroscopy, 5-7 ppm is a characteristic range for hydrogens on aliphatic carbon-carbon double bonds. Therefore, the spectra of FIG. 1 demonstrate that the inventive solid acrylic resin is unsaturated and contains active double bonds. When this solid acrylic resin is added to a UV curing system, it can be polymerized with UV-curable monomers to form an integral three-dimensional cross-linked network structure, which imparts better physical and chemical properties to the coating and is helpful in accelerating photocuring and reducing shrinkage of the coating.

Solubility Test

A solid acrylic resin prepared in accordance with (Example 2, 4 or 5 of) the present invention was dissolved at room temperature individually in the solvents dimethylbenzene and dichloromethane at a solid content of 30%. After stirring for a while, both the resulting solutions were clear, transparent and free of undissolved substances and turbidity, demonstrating excellent solubility of the solid acrylic resin prepared in accordance with (Example 2, 4 or 5 of) the present invention in the organic solvents.

Verification of Low Viscosity Properties at High Solid Contents

A saturated solid acrylic resin obtained by copolymerization of MMA and BMA only, which does not contain the bifunctional monomer TPGDA described in the present invention, and the inventive solid acrylic resin obtained in accordance with Example 2, 4 or 5 of the present invention were individually dissolved in ethyl acetate respectively at solid contents of 30%, 40%, 50% and 60%. The dissolutions were observed for how fast and well they went on, and the rotational viscosities of the resulting solutions were measured. Both the measurements and dissolutions were performed at a temperature controlled at 20° C.

Findings in the dissolution observations are as follows:

Although both the comparative and inventive resins were completely dissolved at all the solid contents of 30%, 40% and 50%, the dissolutions of the inventive resin were faster. At the solid content of 60%, the inventive resin was completely dissolved after it was left overnight, but the comparative resin was not completely dissolved even after being left for three days. These demonstrate excellent solubility of the inventive resin.

Viscosity measurements of the solutions of the two resins in ethyl acetate at the various solid contents are summarized in Table 4.

TABLE 4

| Sample | Viscosity at 30% solid content | Viscosity at 40% solid content | Viscosity at 50% solid content |
|--------|-------------------------------|-------------------------------|-------------------------------|
| Inventive resin | 17 mpa·s | 40 mpa·s | 280 mpa·s |
| Comparative resin | 31 mpa·s | 205 mpa·s | >500 mpa·s |

As can be seen from the viscosity measurements in Table 4, the inventive resin exhibits low viscosities at high solid contents and thus can be added to a UV curing system at a greater amount without causing an excessive increase in the system's viscosity. This allows a significantly reduced solve content of the system, which is more favorable to safety and environmental protection.

Compatibility Test with UV-Curable Monomers

Table 5 shows data about the compatibility of an inventive resin (i.e., a solid acrylic resin prepared in accordance with Example 2, 4 or 5) with various UV-curable monomers at different solid contents and temperatures.

TABLE 5

| UV-curable monomer | Solid content (%) | Temperature (° C.) | Compatibility |
|--------------------|-------------------|--------------------|----------------|
| Trimethylol-propane triacrylate (TMPTA) | 15 | 70 | Compatible and forms a clear transparent solution |
| | 30 | 70 | Compatible and forms a turbid solution |
| Hexanediol diacrylate (HDDA) | 30 | 70 | Compatible and forms a clear transparent solution |
| | 40 | 70 | Compatible and forms a clear transparent solution |
| | 50 | 70 | Compatible and forms a clear transparent solution |
| | 60 | 70 | Compatible and forms an oversaturated solution |
| Tripropylene glycol diacrylate (TPGDA) | 15 | 70 | Compatible and forms a clear transparent solution |
| | 30 | 70 | Compatible and forms a turbid solution |
| Isobornyl methacrylate (IBOMA) | 30 | 70 | Compatible and forms a clear transparent solution |

As can be seen from Table 5, the solid acrylic resin prepared using the process of the present invention is well compatible with the various UV-curable monomers. At 70° C., it is completely compatible and forms transparent solutions with many of UV-curable monomers at a solid content of at least 1500. Therefore, it is very suitable for use in a UV curing system.

Coating Performance Test

A saturated solid acrylic resin obtained by copolymerization of MMA and BMA only, which does not contain the bifunctional monomer TPGDA described in the present invention, and the inventive solid acrylic resin obtained in accordance with Example 2, 4 or 5 of the present invention were separately applied on PVC plates as coating films, which were then subjected to tests for adhesion, pencil hardness, ethanol resistance, butanone resistance, acid and alkali resistance and scrub resistance. Details of the tests are given below.

1) Adhesion: Quantitative tests were performed on a Defelsko PosiTest AT-A tester (the U.S.) in compliance with the ASTM D4541/D7234, ISO 4624/16276-1 and AS/NZS 1580.408.5 standards. A coating sample of each resin on PVC was manually prepared using a solvent evaporation method and affixed to a 50-mm dolly using an AB adhesive and left overnight at room temperature for curing. The test was configured with a pull rate of 0.03 MPa/s and had a measurement range of 0.4-3.8 Mpa. The tester's reading at the time when the coating was pulled off from the substrate was recorded as a measurement of the coating's adhesion to the substrate.

2) Pencil Hardness: An HB pencil was pushed and dragged 3 centimeters on the coating at a constant speed and an angle of 45°, this was repeated 5 times. The pencil lines were then carefully erased with a rubber, and a visual inspection was performed to check whether there was a scratch left on the coating. If no scratch was left, the above process was repeated using a harder pencil, and this was continued until there was a scratch left on the coating. Otherwise, if there was a scratch left, the above process was repeated using a softer pencil, and this was continued until there was no scratch left on the coating. The hardness of the pencil that did not leave a scratch in the last repetition was taken as a result of the test.

3) Ethanol Resistance: An absorbent cotton ball was completely soaked in 98% ethanol and rubbed forth and back against the coating for repeated cycles at a uniform force until the substrate was exposed. The number of rubbing cycles that the coating had experienced before the substrate was exposed was recorded as a measurement of the coating's resistance to ethanol.

4) Butanone Resistance: This test is similar to the ethanol resistance test except for using butanone in place of ethanol as a solvent.

5) The acid and alkali resistance and scrub resistance were tested using methods specified in GBT17748-2008.

The results of the tests are summarized in Table 6.

As can be seen from the data in Table 6, the inventive resin exhibited better adhesion to the substrate, hardness as high as that of H pencils, strong resistance to ethanol and butanone, good acid and alkali resistance and good scrub resistance.

Photocurable Coating Performance Test

A saturated solid acrylic resin obtained by copolymerization of MMA and BMA only, which does not contain the bifunctional monomer TPGDA described in the present invention, and the inventive solid acrylic resin obtained in accordance with Example 2, 4 or 5 of the present invention (150%) were individually mixed with TPGDA as a monomer (80%) and benzophenone as a photoinitiator (5%) to form simple photocurable compositions, which were then tested for UV curing performance. Photocurable coatings were prepared from the compositions and subjected to tests for their adhesion (tape test using PVC substrates), pencil hardness, ethanol resistance and solvent resistance. The test results are summarized in Table 7.

TABLE 7

| Test | Standard | Inventive resin | Comparative resin |
|---|---|---|---|
| Photocuring speed | — | 52 m/min | 38 m/min |
| Adhesion | ASTM D3359-09 | Pass | Pass |
| Pencil hardness | GB 6739-86 | 2H | HB |
| Ethanol resistance | Forth-and-back rubbing cycles at a load of 0.5 kg | 500 Cycles | 500 Cycles |
| Solvent (butanone) resistance | Forth-and-back rubbing cycles at a load of 0.5 kg | 195 Cycles | 82 Cycles |

As can be seen from Table 7, the solid acrylic resin prepared in accordance with the present invention imparted to the photocurable coating not only better hardness (as high as that of 2H pencils) and better solvent resistance (500 cycles of forth-and-back rubbing with ethanol and 195 cycles of forth-and-back rubbing with butanone, both at a load of 0.5 kg) but also a faster photocuring speed. Therefore, it is very suitable for use in the preparation of UV curable coating or paints.

Further, solid acrylic resins prepared in accordance with the present invention have a weight average molecular weight of 25,000-30,000, a glass transition temperature of 30-50° C. and an intrinsic viscosity of 0.08-0.14.

In summary, solid acrylic resins prepared using the method of the present invention contain active double bonds, and when added to a UV curing system, can participate in a subsequent crosslinking reaction occurring in the system, thus helping in accelerating the photocuring speed and reducing shrinkage of the coating. Moreover, the solid

TABLE 6

| No. | Sample | Adhesion (to PVC, MPa) | Pencil hardness | Ethanol resistance | Butanone resistance | Acid and alkali resistance and scrub resistance |
|---|---|---|---|---|---|---|
| 1 | Comparative resin | 0.14 | HB | >500 cycles | 70 cycles | With whitening and peeling |
| 2 | Inventive resin (Example 2) | 0.23 | H | >500 cycles | 155 cycles | Without whitening, bubbling, peeling or discoloration |
| 3 | Inventive resin (Example 4) | 0.21 | H | >500 cycles | 127 cycles | | acrylic resins can be dissolved in organic solvents, allow low viscosities at high solid contents, and are compatible with many UV-curable monomers at a solid content of at least 15%. Further, coating films and photocurable coatings formed from them exhibit high hardness and outstanding solvent resistance. Therefore, they are very suitable for use in UV curing systems. In comparison with the prior art, the present invention presents notable progress and offers unexpected technical effects.

Finally, it is to be pointed out that presented above are merely some preferred embodiments of the present invention, which should not be construed as limiting the scope of the invention in any sense. Any and all non-substantive modifications and variations made by those skilled in the art in light of the teachings above are intended to also fall within the scope of the present invention.

What is claimed is:

1. A preparation process of a solid acrylic resin suitable for use in a UV curing system, which is a bulk polymerization method and consists of the following steps:

adding 100 parts by mass of at least one monofunctional monomer(s) having one polymerizable double bond per molecule, 1-5 parts by mass of one difunctional monomer having two polymerizable double bonds per molecule, 0.3-2.0 parts by mass of an initiator and 3-6 parts by mass of a chain transfer agent to a bulk polymerization reactor capable of water bath heating;

homogenizing them by stirring;

and then heating the bulk polymerization reactor in water bath with a constant temperature at 50-60° C. until the polymerization reaction is completed, wherein the initiator is composed of a main initiator and a co-initiator, and wherein the main initiator is lauroyl peroxide, and the co-initiator is 2, 5-dimethyl-2, 5-di(tert-butylperoxy) hexane or di-tert-butylperoxyhexahydroterephthalate, and the mass ratio of the main initiator to the co-initiator is 5:1, and wherein said solid acrylic resin is an unsaturated resin containing active double bonds, and when the reaction is completed, residual monomer is less than 1%.

2. The preparation process according to claim 1, wherein the monofunctional monomer(s) is (are) selected from at least one of methyl methacrylate, ethyl methacrylate, propyl methacrylate, n-butyl methacrylate, isobutyl methacrylate, tert-butyl methacrylate, iso-octyl methacrylate, isobornyl methacrylate, lauryl methacrylate, methacrylic acid, acrylic acid, ethyl acrylate, methyl acrylate, butyl acrylate, iso-octyl acrylate, lauryl acrylate and styrene.

3. The preparation process according to claim 1, wherein the difunctional monomer is selected from one of ethylene glycol diacrylate, hexanediol diacrylate, tripropylene glycol diacrylate, butanediol diacrylate, neopentyl glycol diacrylate, diethylene glycol diacrylate, triethylene glycol diacrylate, dipropylene glycol diacrylate and allyl acrylate.

4. The preparation process according to claim 1, wherein the chain transfer agent is selected from at least one of n-propyl mercaptan, n-butyl mercaptan, n-octyl mercaptan, n-dodecyl mercaptan, dithioester and a-methylstyrene dimmer.

5. The preparation process according to claim 1, wherein the monofunctional monomer is a combination of methyl methacrylate and n-butyl methacrylate.

6. The preparation process according to claim 5, wherein in 100 parts by mass of monofunctional monomers, the combined mass ratio of methyl methacrylate to n-butyl methacrylate is 2:1 to 3:1.

* * * * *